United States Patent [19]

Martone et al.

[11] 3,983,394

[45] Sept. 28, 1976

[54] RADIATION CAMERA EXPOSURE CONTROL

[75] Inventors: Ronald J. Martone, Cheshire; Michael Yarsawich, East Haven; Walter Wolczek, Trumbull, all of Conn.

[73] Assignee: Picker Corporation, Cleveland, Ohio

[22] Filed: June 10, 1974

[21] Appl. No.: 477,940

[52] U.S. Cl. ............................ 250/363 S; 250/369
[51] Int. Cl.² ........................................ G01T 1/164
[58] Field of Search ......... 250/363, 366, 369, 363 S

[56] References Cited
UNITED STATES PATENTS

| | | | |
|---|---|---|---|
| 2,778,949 | 1/1957 | Borkowski et al. | 250/369 |
| 3,509,341 | 4/1970 | Hindel et al. | 250/366 |
| 3,573,458 | 4/1971 | Anger | 250/369 X |

*Primary Examiner*—Archie R. Borchelt
*Attorney, Agent, or Firm*—Watts, Hoffmann, Fisher & Heinke Co.

[57] ABSTRACT

A system and method for governing the exposure of an image generated by a radiation camera to an image sensing camera is disclosed. The exposure is terminated in response to the accumulation of a predetermined quantity of radiation, defining a radiation density, occurring in a predetermined area. An index is produced which represents the value of that quantity of radiation whose accumulation causes the exposure termination. The value of the predetermined radiation quantity represented by the index is sensed so that the radiation camera image intensity can be calibrated to compensate for changes in exposure amounts due to desired variations in radiation density of the exposure, to maintain the detectability of the image by the image sensing camera notwithstanding such variations. Provision is also made for calibrating the image intensity in accordance with the sensitivity of the image sensing camera, and for locating the index for maintaining its detectability and causing the proper centering of the radiation camera image.

32 Claims, 6 Drawing Figures

RADIATION CAMERA EXPOSURE CONTROL

BACKGROUND OF THE INVENTION

1. Field of the Invention

This invention relates to the field of radiation cameras, and particularly to a system and method for controlling the exposure of the radiation camera image to an image sensing device.

2. Description of the Prior Art

Radiation cameras are known which receive radiation stimuli emanating from a subject and convert them into a detectable display image representing the intensity and location of those stimuli.

Such radiation cameras are of use in medical diagnostic applications. It is known that certain organs and tissues of animal bodies have an affinity to accumulate particular radioactive isotopes. When an isotope is injected into the body, it tends to accumulate in a disproportionate amount in the particular organs and tissues having the affinity for it. When the organ having the affinity for the isotope is known, radiation due to the accumulation of the isotope in the organ can be observed by a radiation camera, and an image of the organ, or of particular healthy and/or diseased tissues of the organ, can be derived. Such images are of significant value in determining the existence and extent of disease or injury.

Known radiation cameras typically each include a detector responsive to radiation from the subject to produce radiation signals which electrically represent the position and intensity of the detected stimuli. Such cameras further include a display apparatus which is responsive to the radiation signals generated by the detector to produce the image corresponding to the pattern of detected stimuli. Such a radiation camera is disclosed in U.S. Pat. No. 3,784,819, to Martone, et al.

A typical display apparatus includes a cathode ray oscilloscope which is connected to the detector, such that the image produced by the radiation camera is a visible image on the tube face of the oscilloscope. Such display apparatus also includes a feature whereby the intensity of the visual display may be adjusted independently of the intensity of the radiation stimuli which cause the production of the image. Such images produced on the tube face of a cathode ray oscilloscope are not permanent in nature.

Notwithstanding the lack of permanency of the images, it is often desirable to make a permanent record of such images, or to convert the images into different formats for auxiliary observation and/or recording. It is, therefore, a common practice to provide radiation cameras with image sensing cameras of various types which may be positioned relative to the display apparatus of the radiation camera so that the image sensing camera may be exposed to record the generated image. Such image sensing cameras are frequently photographic cameras, including a structure for holding a piece of light sensitive film in a position disposed toward the image generated by the display apparatus. It is known to control the aperture of such photographic cameras to govern the amount of light incident on the film from the image, so that the exposure may be limited in accordance with the film sensitivity.

It is also known to expose the image to a television image sensing camera, for transmission of the image to a remote location. Such television cameras also often incorporate aperture control for governing the amount of exposure in accordance with the sensitivity of the instrument.

In order to make an image of the radiation emanating from a subject, the radiation camera is operated for a time, during which time a predetermined quantity of radiation stimuli cumulatively detected is used to generate the display image. The quantity of radiation used to make the image is known as the information density of the exposure. The display image thus generated is projected onto the image sensing device, such as the photographic camera.

For a given oscilloscope intensity setting, the information density of the exposure interval must be within a specified range for the picture to have optimum quality, because the information density has a significant relationship to the quality of the image obtained. If the information density is too small, insufficient data will be detected by the radiation camera, and the radiation camera display and the resulting photographic image will be faint and of poor resolution. If the information density is too great, the light sensitive film of the photographic camera will be over-exposed, the image will have poor resolution, and the background and scatter radiation will obscure the desired image of the organ or tissue being examined.

It is necessary to vary the value of the information density input to the radiation camera according to the type of tissue being examined and the isotope being used. The brightness of the display image, however, varies with the information density, and this often causes over or under exposure of the image on the photographic image sensing camera.

An effective way to compensate for this potential over or under exposure is to independently adjust the brightness of the cathode ray oscilloscope display apparatus. Such adjustments can enable an operator to derive an image brightness for properly exposing the film to get a good quality photograph of the image.

In the past, this independent intensity adjustment has necessarily been made by trial and error. The operator, after selecting the appropriate information density to derive the proper information from the radiation stimuli, must independently adjust the intensity of the image produced by the display apparatus. This technique causes waste of time, is imprecise, requires skill, and often yields poor pictures despite the operator's best efforts.

This procedure is further complicated by the necessity for coordinating this brightness adjustment with the sensitivity of the film used in the photographic image sensing camera, and with the exposure aperture. Thus, the operator is faced with the task of coordinating the three variables of image display brightness, exposure aperture, and film sensitivity, with the fourth variable, information density.

It is therefore an important purpose of this invention to provide a system and method for assisting the operator in precisely selecting the proper brightness level for the display image so as to derive an acceptable photograph, notwithstanding variations which necessarily must occur in the formation density necessary to gather sufficient radiation stimuli for creating the image, and variations in the aperture and film sensitivity of the photographic sensing camera.

Known radiation cameras require the operator to center the revelant portion of the image on the display apparatus presentation format by trial and error. It is another purpose of this invention to provide an improved method and system for facilitating the location of the image produced by the display apparatus at a predetermined point on that apparatus for best viewability.

SUMMARY OF THE INVENTION

This invention is directed to an exposure control system to maintain the detectability by an image-sensing camera of the image generated by a radiation camera, notwithstanding variations in the formation density radiation quantity utilized in producing the image to be detected, and notwithstanding variations in the exposure aperture and film sensitivity of the image-sensing camera. The invention is also directed to a system and method for facilitating the centering of the display image in the display format.

The exposure control system is designed for use in a radiation camera having a detector responsive to radiation stimuli emanating from a subject for producing radiation signals representing the position and intensity of the detected stimuli, and a display apparatus connected to the detector for producing an image representing the positional location and intensity of such stimuli in response to the radiation signals. The radiation camera is designed to expose the image generated by the display apparatus to an image-sensing device, such as a photographic camera. The image produced by the display apparatus is also adjustable in intensity independently of variations in intensity of the radiation stimuli which are represented by the image.

The exposure control system includes an information control circuit which is connected to the detector for governing the amount of exposure of the photographic camera to the image as a function of the selected information density utilized to create the image which is desired to be recorded. The exposure control system according to this invention also includes an index producing circuit connected between the information control circuit and the display apparatus which causes the display apparatus to generate raster index having an intensity which is a function of both the information density utilized in producing the display image and the independent intensity adjustment of the display. The system also has an index representation indication circuit for indicating the intensity of the index to enable precise calibration of the display image intensity by the independent intensity adjustment in response to the selected variations in the formation density. A preferred feature of the exposure control system of this invention includes another circuit connected to the index representation indicating circuit for adjusting the responsitivity of that circuitry as a function of the sensitivity of the image-sensing camera, which is a variable of both the exposure aperture and the film sensitivity.

In the preferred embodiment of the present system, the information control circuit feature includes window generating and comparator circuitry for defining a window in the detector field of view and for gating to an output an indication of only those stimuli occurring within the window. The output is connected to an information density counter for producing a signal for terminating the exposure upon the completion of the accumulation of the desired information density for the exposure. The information control circuit also includes apparatus for adjustably varying the information density, or quantity of radiation, selected for use in making the exposure.

In a preferred form of the system of this invention, there is also included an apparatus feature whereby the boundaries of the window may be adjusted.

The index producing circuit feature of the present system preferably includes a variable frequency oscillator connected to the information control circuit for generating a signal of a frequency which is a function of the preselected information density. Digital to analog converting circuitry is connected to the variable frequency oscillator in order to generator signals producing a digital raster index on the display apparatus. The frequency of generation of this digital raster, and hence its intensity, is a function of the frequency of the output of the variable oscillator.

According to a preferred form of the index producing circuit that circuit also includes a linear to exponential decoder between the information control circuit and the variable frequency oscillator for causing the output of the variable frequency oscillator to vary as an exponential function of the selected information density used in making the exposure. The intensity of the raster is, of course, also determined by the independent brightness control on the display apparatus.

The index intensity indicating circuit of the present system includes a photo sensor positionable to view the index and for producing a signal having a value which varies as a function of the index intensity, and a meter connected to the photo sensor for indicating visually the value of the photo sensor output signal.

This exposure control indicating system facilitates the setup of the display apparatus to produce an image whose detectability by the photographic camera is maintained regardless of changes in the preselected information density used in making the exposure, and regardless of changes in the exposure aperture and film sensitivity associated with the photographic camera.

In operation of the present system, the operator first adjusts the responsivity of the intensity indicating circuit in accordance with the film sensitivity and the exposure aperture in the photographic camera. The information density desired to make the exposure is then input to the information control circuit. The system thus generates the digital raster which has an intensity which is an increasing function of the information density selected, and which therefore serves as a predictor of the expected amount of light to be generated by the display apparatus in imaging the raidation during the exposure. Since the index intensity is indicated visually, and varies with the display brightness control, the operator can use this visual indication to set the independent brightness of the image in accordance with the amount of radiation expected to be imaged during the exposure interval.

The centering facilitating feature of the system of the present invention includes circuitry connected to the index producing circuitry for producing a reference in the display apparatus located spatially at a predetermined point with respect to that index which is susceptible fo being produced by the index producing circuitry in its then current state of adjustment. This feature also includes circuitry for simultaneously modifying the position of the index and the reference, and a marker apparatus for defining a predetermined point on the display apparatus such that when the reference is positioned at the point, the index is optimally viewable by the photosensor.

In the preferred embodiment of the system of this invention, a feature is included whereby the position modifying circuitry is also connected to the display apparatus for centering, at a second predetermined point, the image generated by the display apparatus simultaneously with the positioning of the reference at the predetermined point at which the index is optimally viewable by the photocell.

Thus, the system of this invention provides for simultaneously positioning the calibration index raster in the optimum position for viewing by the index representation indication circuit and centering the scintillation display.

Other features and purposes of this invention will become apparent from a study of the following drawings and detailed description of the preferred embodiment of the system of this invention.

DESCRIPTION OF THE PREFERRED EMBODIMENT

Figure 1:
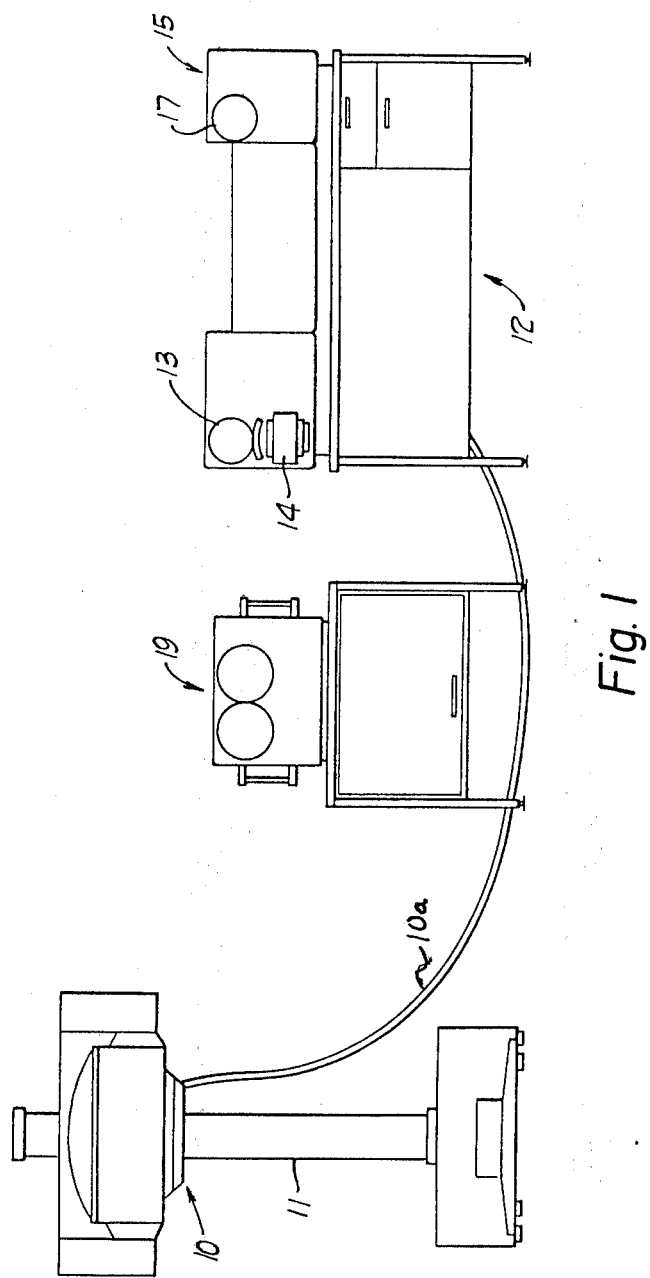
FIG. 1 is an elevational view of a radiation camera incorporating the system of this invention.

A radiation camera in which the system and method of the present application is suitably employed is illustrated generally in FIG. 1. FIG. 1 shows a detector head 10, generally designated. The head is adjustably mounted on a stand 11 for positioning adjacent a patient or other subject. Electrical signals from the head 10 are conducted through a cable 10a to circuitry contained within a console shown generally as 12.

These electrical signals, after processing by the circuitry within the console 12, produce a graphic image of the subject under investigation on a monitor oscilloscope 13. A duplicate image is produced on a camera oscilloscope cathode ray tube, which is viewed and photographed by an image sensing photographic camera 14. The camera 14 in FIG. 1 obscures the camera oscilloscope tube.

The circuitry in the console 12 produces analog signals from the electrical signals derived from the head 10. The analog signals represent photopeak events, caused by radiation stimuli emanating from the subject. The analog signals preferably are then digitized by the circuitry of the console 12. The digital signals may preferably be fed to a computer (not shown) for further processing, or recording.

The digital information can be also fed to a built-in digital data processor 15. This processor utilizes the digital information to generate either a variable width profile histogram of counts versus horizontal distance or a histogram of counts versus time. Such histograms may preferably be displayed on a monitor 17.

The digital information may also suitably be fed to a tape recording console shown generally at 19 for storage and subsequent utilization. The digital information is reconverted to analog form by the circuitry of the console 12 to produce the images displayed on the monitor oscilloscope 13 and recorded by the camera 14 from the image produced on the camera oscilloscope cathode ray tube.

A suitable radiation camera system into which the system and method of this invention may be incorporated is disclosed in U.S. Pat. No. 3,683,180, to Martone, et al.

Figure 2:
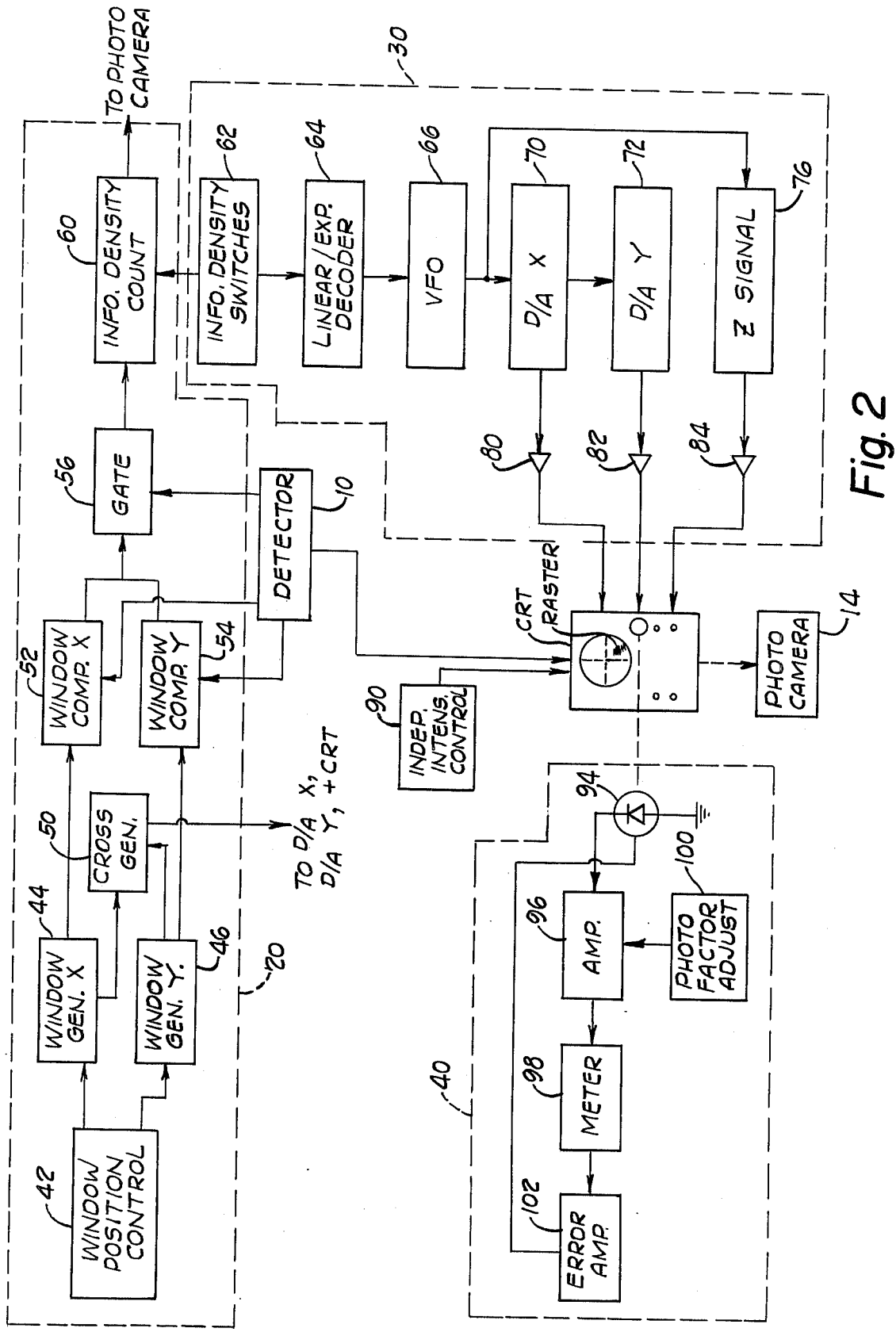
FIG. 2 is a block diagram of the system of this invention.

The exposure control system of the present invention is illustrated in block form, with a radiation camera, in FIG. 2. The detector head 10 directs electrical signals representing the intensity and positional location of radiation stimuli emanating from the subject to the camera oscilloscope which produces an image on its tube face representative of the intensity and location of those stimuli.

The exposure control system includes an information control circuit 20 for measuring the quantity of radiation occurring within a predetermined range of locations representing a window in the detector field of view, and limits the degree of exposure of the image generated by the camera oscilloscope CRT in response to the accumulation of a predtermined radiation quantity count having occurred within the window. An index producing circuit 30 causes the camera display oscilloscope to produce a digital raster index on its tube face having an intensity which is a function of the predetermined quantity of radiation which causes the information control circuit 20 to limit the exposure. The system also includes an index representation indicating circuit 40 which generates a signal indicative of the intensity of the index produced by the index producing circuit.

Together, the information control circuit, index producing circuit and the index representation indicating circuit enable the calibration of the brightness of the image produced by the camera display oscilloscope such that the image will remain optimally detectable by the photographic camera notwithstanding changes which are made in the predetermined quantity of radiation used in making the exposure.

The information control circuit includes a window position control 42 and window generating circuits 44 and 46 for electrically defining the boundaries of a window encompassing a predetermined range of locations within the field of view of the detector head 10. The signals indicating the boundaries of the window are transmitted to two comparator circuits 52 and 54 which compare the window defining signals with the radiation signals coming from the detector head 10.

When the comparator circuits 52 and 54 indicate that a particular radiation stimulus has occurred within the window, the gate 56 produces a counting signal which is directed to an information density counter 60. The information density counter 60 is responsive to an adjustable predetermined quantity of radiation stimuli occurring within the window (and represented by the counting pulses) to generate an output which is directed to the photo camera. This output serves to limit the exposure of the image generated by the camera oscilloscope CRT to the photo camera 14.

The information control circuit 20 may be programmed to terminate the exposure of the image generated by the camera oscilloscope in response to the occurrence of a predetermined amount of radiation stimuli within the predetermined window.

A cross-generator 50 is connected to the window generator circuits 44 and 46 and generates, from the electrical representation of the window boundaries, a cross, for presentation on the oscilloscope tube face, which indicates visually the location of the window.

The index producing circuit includes the information density switches 62, a linear to exponential decoder 64, a variable frequency oscillator 66, digital to analog converter circuitry 70 and 72, and unblanking signal processor 76, and buffer amplification circuitry 80, 82 and 84.

The information density switches 62 produce a set of outputs which (1) establish the predetermined adjustable quantity of radiation to which the information density counter 60 responds to limit the exposure, and (2) generate another similar set of outputs which are directed to the linear to exponential decoder 64. The linear to exponential decoder 64 produces an output which is an exponential function of the value represented by the output of the information density switches 62. The decoder 64 controls the variable frequency oscillator 66, which in turn produces a signal having a frequency which is a function of the output of the decoder 64. This output of the variable frequency oscillator 66 is directed to the digital to analog converting circuits 70 and 72, and also to the unblanking signal processor 76.

The unblanking processor 76 responds to the existence of the variable frequency oscillator output to unblank the camera oscilloscope by way of the buffer amplifier 84. The digital to analog converter circuits 70 and 72 respond to the frequency of the output of the variable frequency oscillator 66 to cause the camera oscilloscope to generate a digital raster index having an intensity which is a function of the frequency of the output of the variable frequency oscillator 66. The buffer amplifier circuits 80 and 82 process the outputs of the converter circuits 70 and 72 in order to determine the location and amplitude of the digital raster on the cathode ray tube of the camera oscilloscope.

The camera oscilloscope has a known type of intensity adjustment circuitry 90 which can be used to adjust the intensity of the image on the tube face of the oscilloscope independently of the intensity of the stimuli which give rise to the electrical signals from which the camera oscilloscope produces its image.

The index representation indicating circuit 40 includes a photosensor 94 which is positionable with respect to the camera oscilloscope to view the digital raster index and to generate a signal which is a function of the intensity of that index. This signal is amplified by the amplifier 96 and is employed to actuate the meter 98 to visually indicate the intensity of the raster index. Since the raster index has an intensity which is a function of the amount of radiation which will be used in making the particular exposure, the value shown on the meter 98 is a function of the amount of illumination from the image on the CRT which will be incident on the film of the photo camera 14. When the operator observes the reading on the meter 98, he can determine whether the amount of light generated by the image in the forthcoming exposure is within the acceptable range for producing a good quality photograph. If it is not, he can manipulate the independent intensity control 90 of the CRT to adjust the raster intensity, and hence the intensity of the subsequent image, to bring the exposures within an acceptable range.

The index representation indication circuit also includes a photo factor adjusting circuit 100, which may be adjusted in accordance with the sensitivity of the film in the photo camera and the exposure aperture used, in order to adjust the responsivity of the combination of the photosensor 94 and the amplifier 96. This responsivity adjustment is used to bias the meter 98 such that the brightness adjustment it indicates for the CRT will take into account the aperture and film sensitivity factors.

An error amplifier 102 is provided to respond to the output of the meter 98 in order to direct feedback to the photo sensor 96 for correcting for drift in the circuit of the photo sensor.

Figure 3:
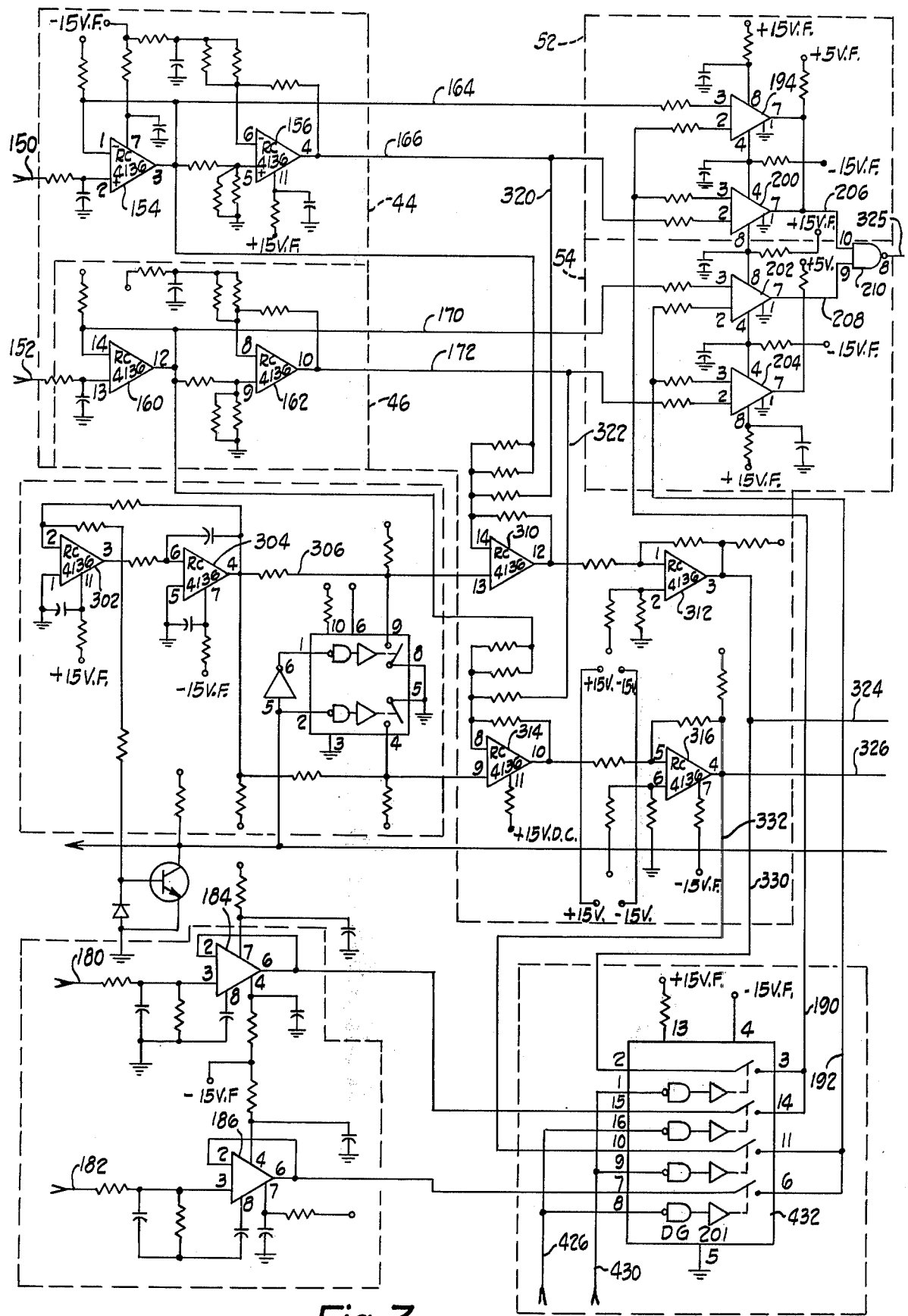
FIGS. 3–6 are schematic drawings of the system of this invention.
Figure 4:
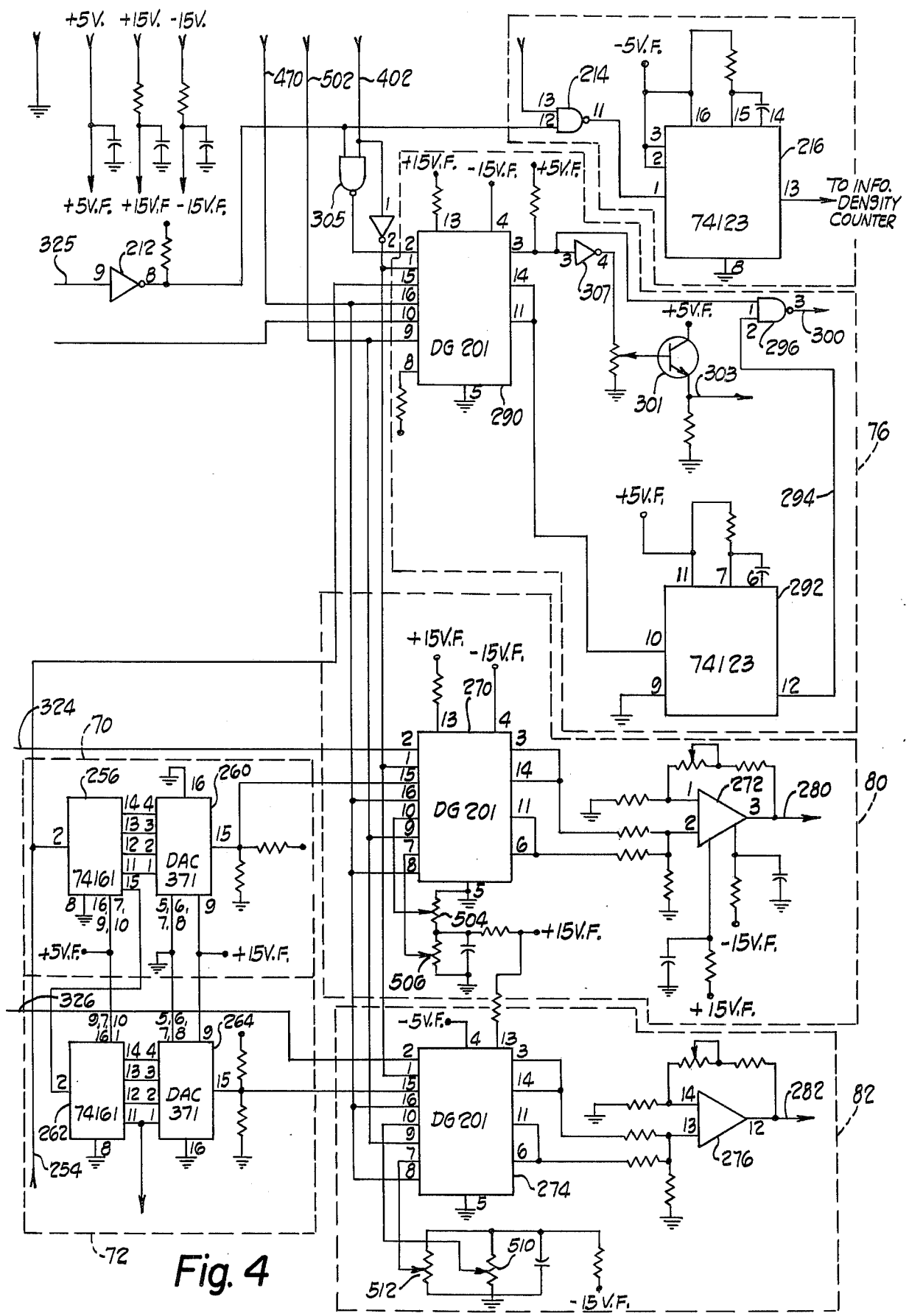

The information control circuit is schematically illustrated in FIGS. 3 and 4. The information control circuit receives window determining signals on a pair of terminals 150, 152, as illustrated in FIG. 3. The window determining signals generate electrical signals defining the boundaries of the window, which window defining signals are compared with the position signals representing the location of stimuli sensed by the detector. Whenever a radiation signal represents a stimulus occurring within the window, a count signal is provided to the information density counter, which, upon the accumulation of the predetermined quantity of such radiation signals, emits an output which terminates the exposure of the image generated by the camera oscilloscope incident to the photographic camera.

The window determining signals are derived from the window position control 42, as illustrated in FIG. 2. The window position control is preferably a known form of mechanical-electrical transducer, which generates a pair of analog electrical voltages which indicate the relative position of a lever about each of two perpendicular axes of rotation. Such a window position control is often referred to as a "joy-stick".

The window generating circuitry is illustrated in FIG. 3, and includes four operational amplifiers designated as 154, 156, 160 and 162. The window generating circuitry produces a pair of electrical signals on two leads 164,166 which indicate the boundaries of the window in the X coordinate, and a pair of signals on two leads 170,172, which indicate the limits of the window with respect to the Y coordinate.

The components of the radiation signals, indicating the location of stimuli sensed by the detector, are input to the window comparator circuitry 52,54, together with the window defining signals. The comparator circuitry 52,54 provides an indication of when the radiation signals represent a stimulus occurring within the window boundaries.

The radiation signals are input to the comparator circuitry by way of a pair of terminals 180,182, bearing the X and Y values of stimulus position, respectively. The signals from the terminals 180,182, are delivered to the comparator circuitry by way of an operational amplifier 184 and an operational amplifier 186, respectively. These radiation signals representing the X and Y coordinates of the detected stimulus appear on the leads 190, 192, respectively, as shown in FIG. 3.

The window comparator circuitry 52,54 is illustrated in FIG. 3. The window comparator circuitry 52 for processing the X window and radiation signal data includes the voltage comparators 194 and 200. The X indicating radiation signal is fed to these amplifiers on the lead 190. The window defining signals delineating the boundaries of the window in the X coordinates are fed on the leads 164,166 to the amplifiers 194,200, respectively. The voltage comparators 194,200 generate a signal on the lead 206 whenever the X value of the radiation signal appearing on the lead 190 is within the boundaries of the window as established by the signals on the leads 164,166.

The Y window comparator circuitry 54 is also shown in FIG. 3, and includes the voltage comparators 202,204. The voltage comparators 202,204 generate a signal on the lead 208 whenever the radiation signal bearing the Y coordinate information fed to the amplifiers 202,204 falls within the Y coordinate boundaries of the window as established by the signals on the leads 170,172, which signals are fed to the comparators 202 and 204, respectively.

The gating circuitry 56 is also shown in FIG. 3 and 4 includes a gate 210, an inverter 212, a gate 214 and a one-shot 216. The gating circuitry provides a counting signal corresponding to each set of radiation signals which indicate the occurrence of a radiation stimulus within the defined window.

The coincidence of signals on the leads 206 and 208 which are input to the coincidence gate 210 cause the gate 210 to produce an output if and only if the position indicated by the radiation signals is within the boundaries of the window in both the X and the Y coordinates. This output of the gate 210 is inverted by the inverter 212, and is input to the gate 214. The other input to the gate 214, which is also a coincidence gate is a master enabling signal for enabling the gate 214 to respond to the signals which are input to it from the inverter 212.

The gate 214 produces an output whenever the gate 210 produces a signal indicating that the radiation signal indicates that a radiation stimulus has occurred within both the X and Y coordinate boundaries of the window. The output of the gate 214 is directed to the one-shot 216, which produces a pulse output in response thereto. This pulse output represents the counting signal and is directed to the information density counter 60.

The information density counter 60 produces an exposure limiting signal for terminating the photographic exposure of the image on the camera oscilloscope in response to the occurrence of a predetermined number of pulses from the one-shot 216, each pulse indicating a radiation stimulus within the window. The information density counter 60 is a counter of known design which may be utilized for counting an adjustable predetermined number of pulses, and emitting an output in response to the accumulation of said adjustable number of pulses.

The adjustable number of pulses is established by the setting on a series of information density switches 62 which, in this preferred embodiment, are a group of thumb wheel switches of known design which produce three decades of digital output in binary coded decimal form. For the sake of simplicity and consequent clarity of the drawings, the specific design of the information density counter 60 and the information density switches 62 is not shown.

Figure 5:
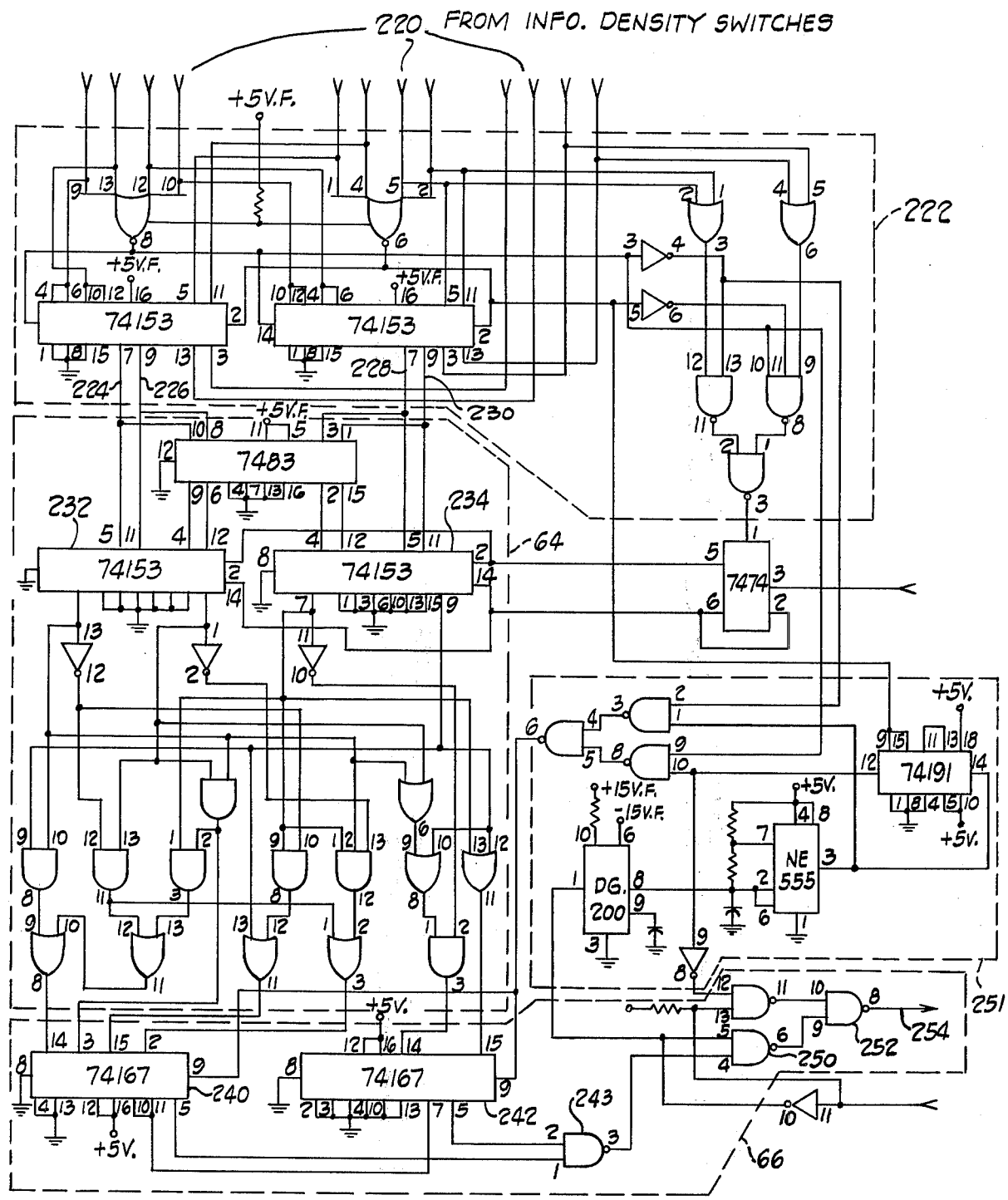

The outputs of the information density switches 62, indicated on FIG. 5 generally as 220, are presented in binary coded decimal form to a decoder indicated within the dotted box and designated as 222. The decoder generates signals representing the value established on the switches 62 on a set of lines 224, 226, 228 and 230.

These signals are input to a linear to exponential decoder, by way of multiplexers 232 and 234. These multiplexers, and their associated downstream gate circuitry, deliver signals to the variable frequency oscillator, which generates a signal having a frequency which is a function of the value of the signals delivered from the linear to exponential decoder.

The value of the signals presented to the variable frequency oscillator is an exponential function of the information density which is selected by the information density switches 62.

The variable frequency oscillator consists primarily of a pair of rate multipliers 240 and 242, which generate outputs to the gate 243 and through the downstream gating including the gate 250 and the gate 252. A clock circuit 251 provides clocking pulses for operating the rate multipliers and actuating the gating of the variable frequency oscillator. The signal from the variable frequency oscillator which has a frequency which is an exponential function of the information density established by the switches 62 appears at a lead 254 which is the output of the gate 252.

The output of the variable frequency oscillator 66 appearing at the lead 254 is directed as an input to the digital to analog converting circuitry 70 and 72, as illustrated in schematic form in FIG. 4. The digital to analog converter circuitry 70 includes the counter 256 and the digital to analog converter 260. The digital to analog converting circuitry 72 includes the counter 262 and the digital to analog converter 264. The output of the variable frequency oscillator 66 appearing on the lead 254 is directed as an input to the counter. The digital to analog converters 260 and 264 each generate a stairstep function in response to the counts registered by their respective counters as a result of the signal input from the variable frequency oscillator.

The outputs of the digital to analog converters 70 and 72 are directed to the buffer amplification circuits 80 and 82 respectively. The buffer amplification circuits 80 and 82 are also illustrated in FIG. 4. The buffer amplification circuitry 80 includes a multiplexer switch 270 and an operational amplifier 272. The buffer amplification circuitry 82 includes a multiplexer switch 274 and an operational amplifier 276. The buffer amplification circuitry 80, by way of the proper setting of the multiplexer switch 270, receives the output of the digital to analog converter circuitry 70, and produces an input to the buffer amplifier 272. The buffer amplifier 272, in response to this input, produces, at the lead 280, the X deflection voltage required for production of the digital raster index. The buffer amplification circuitry 82 receives, by way of the proper setting of the multiplexer switch 274, the output of the digital to analog converter circuitry 70 and in response thereto, directs an input to the buffer amplifier 276. In response to this input the buffer amplifier 276 generates, on the lead 282 a Y deflection voltage which is suitable for producing the digital raster on the tube face of the camera oscilloscope, when acting in conjunction with the deflection voltage present on the lead 280.

In order for the raster to be produced, there must also be furnished an unblanking signal to the camera oscilloscope. FIG. 4 illustrates the unblanking processing circuitry 76 and the buffer amplification circuitry 84 which acts to provide this unblanking signal.

For this purpose, the output of the variable frequency oscillator appearing on the lead 254 is directed to the multiplexer switch 290. In response to the signal from the variable frequency oscillator, the multiplexer 290 directs signals to a one-shot 292 which in turn generates a signal on the lead 294 which is directed as one input to a gate 296. The gate 296 produces at its output on a lead 300, the unblanking signal for enabling the cathode ray oscilloscope to produce the digital raster. Together, the raster producing signals appearing on the leads 280, 282 and 300 are directed as inputs to the camera oscilloscope in a known fashion to produce the digital raster.

The preferred embodiment of the system of this invention is provided with a cross generator 50 for causing the camera oscilloscope to generate a cross indication on its tube face showing the location of the window defined by the window generating circuitry 44 and 46. The cross generator circuit is illustrated in FIG. 3.

The cross generator circuit 50 includes a pair of operational amplifiers 302 and 304 which generate a crossclock signal on a lead 306 output from the amplifier 304. The cross is generated by the circuitry including and associated with the operational amplifiers 310, 312, 314 and 316. The amplifiers 310 and 314 receive the cross signal on the lead 306. The amplifier 310 also receives an input indicating the X coordinate location of the defined window on a lead 320. The amplifier 314 receives an input indicating the Y coordinate position of the window on a lead 322.

In response to these inputs, the amplifiers 312 and 316 produce, on the leads 324 and 326, respectively, signals bearing information for producing the cross on the tube face of the oscilloscope indicating the location of the window. These signals, on the leads 324 and 326, are directed as inputs to the multiplexer switches 270 and 274, respectively, as illustrated in FIG. 4. The signals on the leads 324 and 326 are also impressed upon the leads 190 and 192, respectively, by way of the leads 330 and 332, respectively. These signals, falling within the window, are impressed on the comparator which results in the production of an output on the gate 210 which is directed to the inverter 212 through a gate 305 to the multiplexer 290. The multiplexer 290 is actuated by a signal on a terminal 402 to pass the output at the gate 305 to an inverter 307 ans enables a transistor 301. The enablement of the transistor 301 causes a rise in potential on a lead 303 which potential rise is directed as a cross unblanking signal to the oscilloscope.

Figure 6:
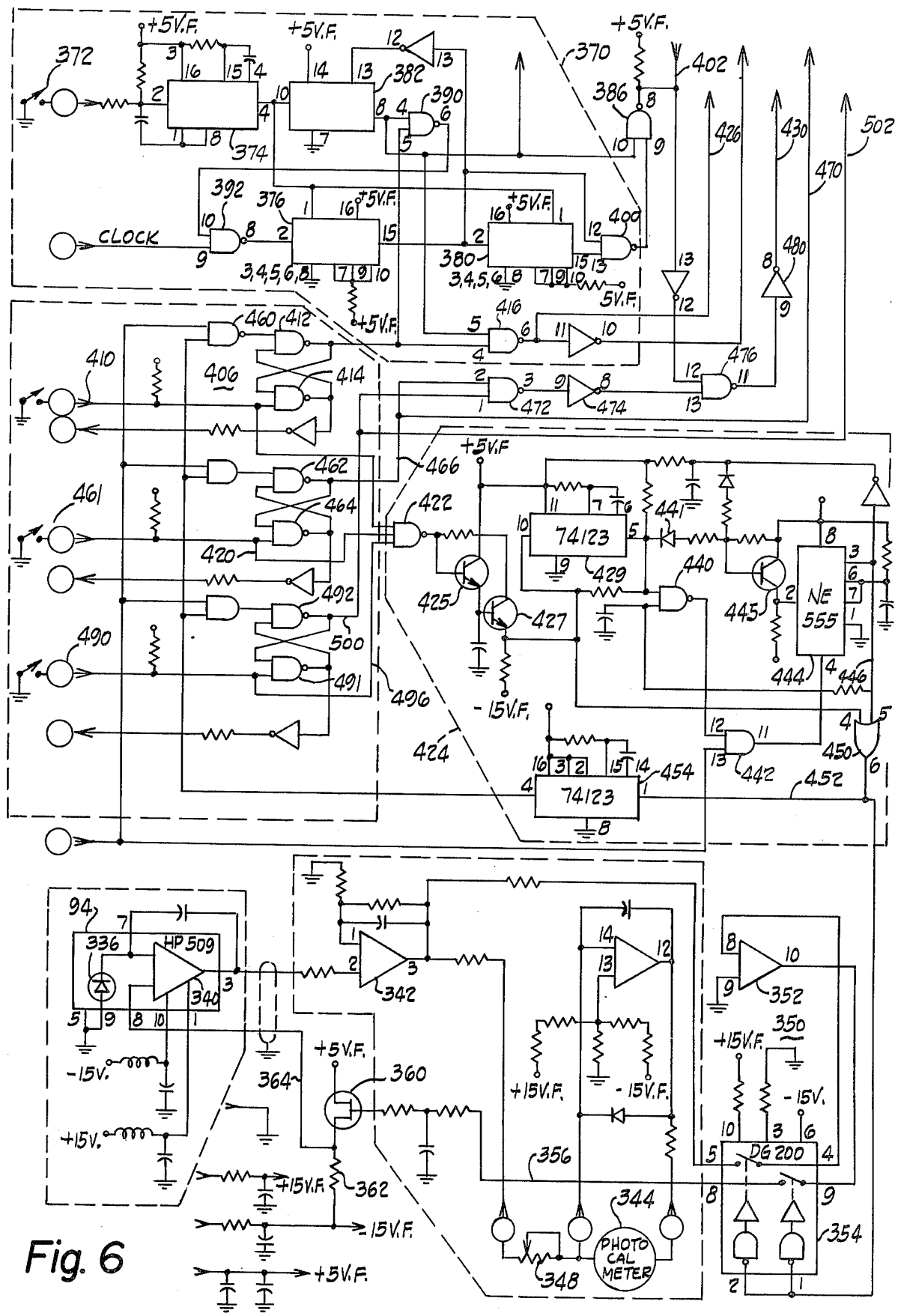

The index representation indicating circuit is illustrated in FIG. 6, and provides an indication which is a function of the intensity of the digital raster index which is generated by the camera oscilloscope. The photosensor 94, shown in FIG. 6 includes a silicon diode 336 which is positionable to view the digital raster and to produce a DC output which is a function of the intensity of that index. The photosensor also includes a low noise amplifier 340 which, together with the diode 336, constitutes a single integrated circuit chip. The output from the photosensor 94 is directed as an input to an amplifier 342, whose output goes to a meter 344 which registers an indication which is a function of the output from the photosensor 94 and consequently is a function of the intensity of the digital raster index.

The photo factor adjustment apparatus is represented in FIG. 6 as a potentiometer 348 which is connected in series with the meter 344. By varying the setting of the wiper arm of the potentiometer 348, the response of the meter to the output from the amplifier 342 may be varied, in order to provide compensation for the sensitivity of the photographic camera, which sensitivity is determined by the exposure aperture and the sensitivity of the film used.

An auto-zero circuit 350 is connected to the output of the amplifier 342 and to the photosensor in order to provide a feedback loop for adjusting the photosensor to compensate for drift in its circuitry in order to maintain the meter 344 as indicating zero when no raster is being generated and the potentiometer 348 is not used.

This circuit includes an amplifier 352, and a multiplexing switch 354, which transmits a signal on a lead 356 in response to the output of the amplifier 342. The signal on the lead 356 controls a field effect transistor 360 which, in combination with the resistor 362, develops on a lead 364 a feedback control signal which is input to the amplifier 340 of the photosensor 94 in order to adjust that amplifier to compensate for circuit drift.

The circuitry of the system of this invention is operated to perform its various functions in response to initiative provided by a number of function generators which are illustrated in schematic form in FIG. 6. One of these function generators is a mark function generator 370, having an input 372. In response to an input at the terminal 372, the mark function generator produces a signal which actuates the index producing circuitry, in cooperation with the cross generator, to produce a cross indicating the position of the window for a period equal to that time required for the occurrence of 16 clock pulses, i.e., approximately 4 milliseconds.

Upon the occurrence of a signal at the terminal 372, the one-shot 374 produces an output. That output sets a flip-flop 382, and also enables a pair of counters 376 and 380. The output from the flip-flop 382 actuates a gate 390 which produces an output which enables a gate 392. The other input of the gate 392 receives the clocking pulses generated by the cross generator, which have been discussed above. These clocking pulses are directed, by way of the output of the gate 392, to the clocking circuit 376, which has been enabled by the output of the one-shot 374.

The output of the counter 376 is directed to an input of a gate 400, whose output is in turn directed to the input of a gate 386. The other input of the gate 386 is derived from the output of the flip-flop 382. The output directed from the clock circuit 376 to the gate 400 persists only for the time required for the counter 376 to count 16 cross clock pulses presented to it by way of the gate 392. Therefore, the output of the gate 400 persists for only that period of time.

During the coincidence of the settinng of the flip-flop 382 and the count of 16 cross clock pulses following the setting of the flip-flop 382; an output is present on the gate 386. This output is directed to the terminal 402. The terminal 402 extends to each of the multiplexers 270 and 274. The pressure of a signal on the terminal 402 sets the multiplexers 270, 274, and 290 to select the cross deflection signals appearing on the leads 324 and 326 for transmission to the amplifiers 272 and 276, and the subsequent presentation of the outputs of those two amplifiers to the oscilloscope in order to generate the cross. Thus, the cross is generated for the period of time it requires to accumulate 16 clock pulses following the impression of a signal on the terminal 372 of the mark function generator.

Another function generator illustrated in FIG. 6 for use in connection with the circuitry of the system of this application is a calibrate function detector 406, having an input terminal 410. When a signal is impressed on the input terminal 410, the calibrate function decoder, for a period of approximately 15 seconds, causes the camera oscilloscope to generate the radiation image derived from the radiation stimuli, and the cross, the latter being located at a point indicating the location of the window. The signal appearing on the input terminal 410 actuates a flip-flop including the gates 412 and 414, to produce an output at one of the inputs of the gate 416.

The signal appearing at the input terminal 410 is also directed, by way of a lead 420, to one of the inputs of a three input AND gate 422. Since the inputs of the gate 422 are normally of the same state, the change of the signal on the lead 420 results in a gating output at the gate 422 in response to the initiation of a signal on the input terminal 410. The output of the gate 422 actuates a timer circuit 424 which times out 15 seconds and then resets the flip-flop including the gates 412 and 414.

While the flip-flop is in its set condition, the gate 416 produces an output which is directed respectively to the terminals 426 and 430. The terminals 426 and 430, as illustrated in FIG. 3, extend to a multiplexing switch 432 which gates the radiation signals coming from the detector onto the lines 190 and 192. When the terminals 426 and 430 are actuated with a signal from the gate 416, the radiation signals are allowed to pass through the multiplexing switch 432, and the system operates as above described to cause the display of the image representing the radiation stimuli sensed by the detector.

The counting circuit 380 also produces a signal which periodically actuates the terminal 402 to cause the production of a cross in the manner described with respect to the mark function generator. The counter 380 emits an output each 256 clock pulses. Thus, the counter 380 emits a pulse approximately every 55 milliseconds. This pulses passes over the line 396 as an input to the gate 400 whose other input is also actuated, by the counts from the counting circuit 376. The output of the gate 400 is input to the gate 386, the other input of the gate 386 being actuated by the flip-flop 382, which is normally in a condition to acutate that input. Thus, when a pulse is produced by the gate 400 and directed to the gate 386, the terminal 402 has momentarily impressed upon it a signal which operates the mulitplexing switches 270 and 274 to mementarily select for transmission to the oscilloscope the cross generating pulses, in the manner described above.

The timing circuit 424 is shown in FIG. 6. The timing circuit includes the gate 422, 2 transistors 425,427, a one-shot 429, a diode 441, a transistor 445, and a timer 444. The gate 422, enables transistors 425,427 which initiates one-shot 429 the output of which passes through diode 441 and through transistor 445 to initiate timer 444.

Upon the expiration of 15 seconds after actuation of the timer 444, the timer produces a reset signal on a line 446. The reset signal is directed through a gate 450 and on a lead 452 to a one-shot 454. The one-shot 454 produces a reset pulse on a lead 456. This reset pulse is utilized for resetting the flip-flop consisting of the gates 412 and 414 by way of the production of an output on a gate 460.

Another function performed by the system of this invention is that of photocalibration. In the photocalibration function, an input on the terminal 461 is applied to cause the circuitry to generate the digital index raster for a period of approximately 15 seconds. During the period of raster generation, the circuitry, including the index representation indicating circuit, is used to calibrate the brightness of the image on the oscilloscope tube.

In order to actuate the photocalibration function, a signal is applied at the terminal 461, which sets the flip-flop including the gates 462 and 464, and actuates the gate 422 to initiate timing by the timer circuit. The flip-flop generates a signal on a line 466 which impresses a signal on a terminal 470 and to an input of a gate 472. The gate 472 in response to this signal generates an output which passes through an inverter 474 annd is input to a gate 476. This input to the gate 476 actuates that gate to produces an output which passes through an inverter 480 and impresses a signal on a terminal 430.

The signal on the terminal 470 is directed to the multiplexing switches 290,270 and 274 (see FIG. 4). The presence of an input on the terminal 470 actuates the buffer amplification circuitry, in response to the signal from the variable frequency oscillator, to produce deflection signals and an unblanking signal, which, when presented to the input terminals of the camera oscilloscope, result in the generation of the digital raster index.

This generation of the digital raster index endures for fifteen seconds, as dictated by the timing circuit. The timer circuit 424, actuated by the input to the gate 422 in response to the appearance of a pulse on the input terminal 460, operates to reset the flip-flop including the gates 462 and 464 by way of producing an output on the gate 472. This terminating operation of resetting the flip-flip is analogous to the action of the timing circuit 424 in connection with the calibrate function which has been described above.

Another function performed by the system of this invention is that of facilitating the centering of the digital raster index in a position optimally viewable by the photocell 94 for detection of the intensity of the digital raster index, and the simultaneous centering of the display representing the pattern of radiation stimuli sensed by the detector.

In order to accomplish this function, an electrical signal is applied to the terminal 490, as illustrated in FIG. 6. This signal sets a flip-flop which includes two gates 492 and 494, and also actuates the timer circuit gate 422 by way of a lead 496.

When the flip-flop is set, it produces a signal on the lead 500 which directs an input to the gate 472, and impresses a signal upon a terminal 502.

The signal on the terminal 502 is applied to each of the multiplexing switches 290, 270 and 294. The presence of a signal on the terminal 502 actuates the multiplexing switch 290 to pass the unblanking signal at the terminal 300, as shown in FIG. 4. Connected to the mulitplexing switch 270 is a potentiometer 504 and a potentiometer 506. Connected to the multiplexing switch 274 is a potentiometer 510 and a potentiometer 512. The potentiometers 506 and 510 each generate a DC voltage which is applied to the multiplexing switches 270 and 274, respectively. The signal from the potentiometer 506 represents the X coordinate of a reference dot which is generated by the transmission of this DC voltage through the buffer amplifier 272 and its application to the camera oscilloscope by way of terminal 280. The potentiometer 510 generates a constant DC voltage which defines the Y coordinate of this reference dot. The reference dot is thus generated by the application of the DC voltages generated by the potentiometers 506 and 510 through the buffer amplifiers 272 and 276 to the terminals 280 and 282 which extend to the inputs of the camera oscilloscope.

The multiplexing switches 270 and 274 are actuated to transmit these voltages to the terminals 280 and 282 in response to the occurrence of a signal on the lead 502. Therefore, when an input pulse occurs on the input terminal 490, a corresponding signal appears on the lead 502, and causes the multiplexing switches 270 and 274, with their associated potentiometers 506 and 510, to generate a reference dot at a position on the oscilloscope tube face which is dependent upon the respective settings of the potentiometers 506 and 510. This reference dot can be moved about the tube face at will be adjusting the X and Y position controls on the camera oscilloscope.

Provision is made in the system of this invention for assuring that, when the reference dot is positioned at a predetermined point on the oscilloscope face, the digital index raster which is susceptible of generation by the circuitry of this system will be located at a second predetermined point having a fixed spatial relationship to the predetermined point. This feature is provided by the potentiometers 504 and 512. Each of these potentiometers is adjusted to supply a DC voltage to its associated multiplexing switch during the production of the digital raster index, in order to impress that signal, along with the signals from the digital to analog converters which provide for the production of the raster, to the terminals 280 and 282, in order to position the raster in accordance with the settings on the potentiometers 508 and 512.

By the proper setup of the values of the potentiometers 506, 510, 504 and 512, the presence of a signal on the terminal 502 may be used to generate a reference dot which is movable about the face of the oscilloscope, and which has a predetermined and constant spatial relationship to the location of the digital raster index. In this way, a set of markers, such as cross-hairs, are preferably provided on the face of the oscilloscope, and are located at that point such that, when the reference dot is positioned on the cross-hairs, the raster is positioned at a different location which renders it optimally viewable by the photocell. This overcomes the difficulty of determining when the raster is optimally positioned in front of the photographic camera, at which point it is not possible to see, because the sensor blocks it from view. The reference dot provides a handy index for accomplishing this with a minimum of delay.

This centering function is coordinated with the function of centering the radiation image generated by the radiation camera. The potentiometers 504, 506, 510 and 512, and the cross-hair location, are chosen such that, whenever the reference dot is located at the cross hairs, the center of the detector field of view appears at the center of the oscilloscope tube face.

The output of the timing circuit 424 which appears on the lead 452 is also input to the multiplexing switch 354. The multiplexing switch 354 gates open or closed the feedback loop which is provided between the amplifier 352 and the photocell 96 by way of the field effect transistor 360. When the timing circuit 424 has completed the timing of one of the fifteen second intervals for executing a function, and the signal for reset occurs on the lead 452 from the gate 450, the multiplexing switch 354 is switched from an open configuration to a closed configuration. During the periods of function execution, the multiplexing switch 354 assumes an open configuration, which interrupts the feedback loop.

This feature is beneficial, in that the feedback loop is designed to to provide for compensation for circuit drift in order to zero the indicator on the meter 344 when no raster is generated. When the photocell and its associated circuit is operating to detect raster intensity, it is deleterious to continue the feedback operation, in that the meter will seek a zero reading, rather than accurately indicating the raster intensity. Thus, the provision of the multiplexing switch 453 allows for the selective operation of the feedback loop.

Many of the components of this preferred embodiment are integrated circuits, having standard numerical designations. Where significant, these components are indicated, in FIGS. 3–6, by their standard designations. Also the pin connections for these various integrated circuits are shown, as well as the values of the various circuit elements. All capacitance values shown as 1.0 or more are in picofarads, while capacitances of less than 1.0 are in microfarads.

The operation of the system of this invention is as follows:

The operator first selects an appropriate film sensitivity and exposure aperture for the photographic camera 14. He then adjusts the photo factor adjusting potentiometer 348 in order to properly compensate the meter reading to account for the adjustment of camera sensitivity. This calibration is preferably facilitated by calibration charts, which interrelate the two independent variables of exposure aperture and film sensitivity with the dependent variable of the setting of the potentiometer 348.

The operator selects the desired information density for the exposure, by manipulating the information density switches 62. He then presses a button on the console which impresses a signal on the input terminal 461, which actuates the photocalibration function. The digital raster index is generated and appears on the face of the oscilloscope tube for a period of approximately 15 seconds. The operator has time to adjust the independent brightness adjustment of the oscilloscope in order to vary the raster intensity to cause the meter 344 to indicate a predetermined reading, which, if fulfilled, indicates that the image will have the proper brightness. This step completes the intensity calibration, and assures that, for the information density selected, the radiation image generated by the camera oscilloscope will be in an intensity range which will yield an acceptable photograph of that image.

The operator then, by way of another control on the console, impresses a signal upon the input terminals 410, initiating the calibrate function, whereby a cross is generated at the location of the window, along with the display of the image corresponding to the sensed radiation stimuli. The operator, by manipulation of the "joystick" can adjust the window generation circuitry in order to position the window over the desired area of interest. This will assure a corelation between the information density which is counted by the information density counter 60 with the actual information density emanating from the organ or area which is being examined.

The operator, if he wishes, can actuate the generation of a cross for a very short period of time by impressing a signal upon the input terminal 372, which initiates the mark function, generating a cross for approximately 55 milliseconds centered in the window, which cross may be photoraphed for recording and later reference.

If necessary, the operator, by the application of a signal to the input terminal 490, generates the reference dot which has a predetermined relation to the location of the raster. He then centers the reference dot over the predetermined point marked by the crosshairs by manipulation of the oscilloscope position controls. This assures that the digital raster is positioned for optimum viewability by the photocell 96 of the index representation indication circuit, and that the radiation image will be centered on the tube face.

It is thus evident that the system of this application and its associated method efficiently performs the exposure control and centering functions according to the objects set forth above. The disclosure of the preferred embodiment set forth here is intended as illustrative, rather than exhaustive, of the invention. It is recognized that those of ordinary skill may be able to discover or make certain modifications, alterations and changes in the disclosure set forth above, and to derive new uses for the embodiment, without departing from the spirit and the scope of the claims herein and the foregoing disclosure.

We claim:

1. An exposure control system for use in a scintillation camera couplable to an image sensing camera and having a display apparatus responsive to radiation signals representing the position of radiation stimuli to produce and expose to the image sensing camera an image representing the positional location of the stimuli, said image being adjustable in intensity independently of said radiation signals, and a detector having a predetermined field of view and being responsive to the radiation stimuli to produce the radiation signals, said exposure control system comprising:
    a. an information control circuit connected to the detector for controlling the amount of exposure of the image to the image sensing camera by terminating the exposure in response to the accumulation of a predetermined quantity of radiation occurring within a predetermined zone of said detector field,
    b. a circuit connected to said information control circuit for producing an index representing the value of said quantity of radiation, said representation further being controllable as a function of said independent intensity adjustmennt of said display apparatus, and
    c. a circuit for indicating the value of said index representation to enable calibration of the image intensity by varying said independent intensity adjustment in accordance with said quantity of radiation and said exposure amount to maintain the detectability of the image by the image sensing camera.

2. The exposure control system of claim 1, wherein said information control circuit comprises:
    a. window generating circuitry for defining said predetermined zone;
    b. window comparator circuitry connected to said window generating circuitry and to said detector for producing a gating signal in response to the occurrence of a radiation stimulus in said defined window;
    c. a gate circuit connected to said window comparator circuitry and to said detector and being responsive to said gating signal and to the occurrence of said stimulus to produce a count signal indicating the occurrence of a radiation stimulus in said window;
    d. an information density counter for generating an exposure termination signal for limiting the duration of said exposure upon the accumulation of occurence of a predetermined quantity of said count signals; and
    e. means connected to said information density counter for adjusting said predetermined quantity of radiation.

3. The exposure control system of claim 2, further comprising:
    apparatus connected to said window generating circuitry for adjusting the boundaries of said window.

4. The exposure control system of claim 2, further comprising:
    a marking generator connected between said window generating circuitry and said display apparatus for causing said displat apparatus to produce an indication of the location of said window.

5. The exposure control system of claim 2, wherein said adjusting apparatus comprises a plurality of thumbwheel switches connected to said information density counter.

6. The exposure control system of claim 1, wherein:
    a. said display apparatus comprises a cathode ray oscilloscope;
    b. said index comprises a digital raster on the tube of said cathode ray oscilloscope, and
    c. said index producing circuit comprises:
        i. a variable frequency oscillator connected to said information control circuit for generating a signal having a frequency which is a function at said quantity of radiation;
        ii. digital to analog converting circuitry connected between said variable frequency oscillator and said cathode ray oscilloscope for producinng raster producing signals for causing said oscilloscope to produce said raster with a repetition frequency, and an intensity, which is a function of said frequency of said variable oscillator signal.

7. The exposure control system of claim 6, further comprising:
    a linear to exponential decoder connected between said information control circuitry and said variable frequency oscillator for causing the output of said variable frequency oscillator to vary as an exponential function of said quantity of radiation.

8. The exposure control system of claim 6, further comprising:
    buffer amplifier circuitry between said digital to analog converter circuitry and said oscilloscope for defining the position and amplitude of said raster on the display of said oscilloscope.

9. The exposure control system of claim 6, further comprising:
    circuit means connected between said variable frequency oscillator and said oscilloscope for producing an unblanking signal for presenting said raster.

10. An exposure control system for use in a scintillation camera couplable to an image sensing camera and having a display apparatus responsive to radiation signals representing the position of radiation stimuli to produce and expose to the imaging sensing camera an image representing the positional location of the stimuli, said image being adjustable in intensity independently of said radiation signals, and a detector having a predetermined field of view and being responsive to the radiation stimuli to produce the radiation signals, said exposure control system comprising:

a. an information control circuit connected to the detector for controlling the amount of exposure of the image to the image sensing camera by terminating the exposure in response to the accumulation of a predetermined quantity of radiation occurring within a predetermined zone of the detector field, b. a circuit connected to the information control circuit for producing a visible index representing the value of said quantity of radiation, said representation further being controllable as a function of the independent intensity adjustment of the display apparatus, and c. a circuit for indicating the value of the index representation to enable calibration of the image intensity by varying the independent intensity adjustment in accordance with the quantity of radiation and the exposure amount to maintain the detectability of the image by the image sensing camera, the index representation circuit comprising:

i. a photosensor positionable to view the visible index for producing a signal which is a function of the index intensity;

ii. a meter connected to the photosensor for indicating the value of the signal produced by the photosensor, and iii. an amplifier connected between the photosensor and the meter.

11. The exposure control system of claim 10, wherein the index representation indicating circuit further comprises:

a feedback error circuit connected to the photosensor and the amplifier for correcting the drift of the photosensor.

12. The exposure control system of claim 10, further comprising:

a potentiometer connected to the meter for calibrating the indications of the meter in accordance with the sensitivity of the image sensing camera.

13. The system of claim 10, wherein the photosensor comprises:

a silicon photodiode coupled to an operational amplifier having a low noise characteristic.

14. An exposure control system for use in a scintillation camera couplable to an image sensing camera and having a display apparatus responsive to radiation signals representing the position of radiation stimuli to produce and expose to the imaging sensing camera an image representing the positional location of the stimuli, said image being adjustable in intensity independently of said radiation signals, and a detector having a predetermined field of view and being responsive to the radiation stimuli to produce the radiation signals, said exposure control system comprising:

a. an information control circuit connected to the detector for controlling the amount of exposure of the image to the image sensing camera by terminating the exposure in response to the accumulation of a predetermined quantity of radiation occurring within a predetermined zone of the detector field, b. a circuit connected to the information control circuit for producing a visible index representing the value of said quantity of radiation, said representation further being controllable as a function of the independent intensity adjustment of the display apparatus;

c. a circuit for indicating the value of the index representation to enable calibration of the image intensity by varying the independent intensity adjustment in accordance with the quantity of radiation and the exposure amount to maintain the detectability of the image by the image sensing camera, the index representation circuit comprising:

i. a photosensor positionable to view the visible index for producing a signal which is a function of the index intensity;

ii. a meter connected to the photosensor for indicating the value of the signal produced by the photosensor, and iii. an amplifier connected between the photosensor and the meter;

d. circuitry connected to the index producing circuitry for causing the display apparatus to produce a reference which has a predetermined spatial relation to the location of that index which is susceptible of production by the index producing circuit;

e. position modifying circuitry for correspondingly adjusting the relative location of the reference and of the index, and f. means defining a predetermined point on the display apparatus, which, when coincident with the reference, renders the index viewable by a portion of the index representation indicating circuit.

15. The system of claim 14, further comprising:

circuitry connected to move the center of the radiation pattern display to a second predetermined point in the display apparatus in response to the movement of the reference to the predetermined point, the radiation pattern display being optimally exposed to the image sensing camera when centered at the second predetermined point.

16. An exposure control circuit for a scintillation camera having a detector for producing signals representing radiation stimuli occurring over a predetermined field, apparatus connected to the detector for producing a visible display of the represented radiation, the visible display having a brightness which is adjustable independently of the radiation signals, and a light sensitive camera for viewing the displayed image, the exposure control system comprising:

a. a density control apparatus for timing out the exposure of the displayed image to the light sensitive camera in response to the accumulation of a predetermined amount of radiation in a zone of the detector field, and b. circuitry enabling calibration of the brightness of the displayed image by the independent adjustment thereof to maintain the viewability of the image by the light sensitive camera in spite of variations in the predetermined radiation density amount which triggers the timing out of the exposure, the calibration circuitry comprising:

i. a circuit for producing a visible index on the display having brightness representing the predetermined radiation amount determined by the density control circuit, the index brightness being adjustable corresponding to that of the displayed image by virtue of the independent intensity adjustment, and ii. a circuit for indicating the brightness of the index, thereby enabling preadjustment of the displayed image brightness by the independent adjustment to assure that the displayed radiation image will have brightness suitable for viewing by the light sensitive camera notwithstanding changes in the radiation density amount determined by the density control apparatus.

17. An exposure control system for a scintillation camera having a detector producing radiation signals representing an image of radiation from a subject, circuitry for processing the radiation signals to form a display of the represented image, a light sensitive camera for viewing the displayed image, and means for adjustably controlling the light energy passing from the display to the light sensitive camera, the system comprising:
   a. circuitry for timing out the exposure of the light sensitive camera to the displayed image in accordance with the attainment of a predetermined information density of a portion of the represented image;
   b. circuitry for producing an index having a value which is a function of both the predetermined information density and the light energy control adjustment, and
   c. means for indicating the value of the index, whereby the light energy passing from the displayed image to the light sensitive camera can be preadjusted to properly expose the image to the light sensitive camera.

18. The system of claim 1, further comprising:
a circuit connected to said index representation indicating circuit for varying the response of said index representation indicating circuit in accordance with the sensitivity of said image sensing camera.

19. A method for controlling the exposure of an image generated by a scintillation camera to an image sensing camera, said scintillation camera including a display apparatus responsive to radiation signals representing the position of radiation stimuli to produce and expose to the image sensing camera an image representing the positional location of the stimuli, said image being further adjustable in intensity independently of the intensity of said radiation stimuli, and a detector responsive to radiation stimuli emanating from a subject to produce the radiation signals, said method comprising the steps of:
   a. controlling the amount of exposure of the image to the image sensing camera by terminating the exposure in response to the accumulation of a predetermined quantity of radiation stimuli occurring within a predetermined range of location,
   b. causing the display apparatus to produce an index representing the value of said quantity of radiation; and
   c. deriving an indication of said representation of said index to enable calibration of the image intensity by varying said independent intensity adjustment in response to variations in said quantity of radiation and in said controlled exposure amount to maintain the detectability of the image by the image sensing camera.

20. The method of claim 19, wherein said exposure controlling step comprises:
   a. defining a window including said predetermined range of locations;
   b. producing a gating signal in response to the occurrence of a radiation stimulus in said window;
   c. producing a count signal indicating the occurrence of a radiation stimulus in said window in response to the occurrence of a radiation stimulus and a gating signal corresponding to said stimulus;
   d. generating an exposure termination signal upon the accumulation of occurrences of a predetermined quantity of said count signals; and
   e. providing for variation in said predetermined quantity of radiation.

21. The method of claim 20, further comprising the step of:
providing for adjustable variation of the boundaries of said window.

22. The method of claim 20, further comprising the step of:
causing said display apparatus to produce an indication of said location of said window.

23. The method of claim 19, wherein said display apparatus includes a cathod-ray oscilloscope, said step of producing said index comprising the steps of:
   a. generating a signal having a frequency which is a function of said quantity of radiation; and
   b. causing said display apparatus to produce a raster in response to said variable frequency signals, the intensity of said raster being a function of said frequency of said variable frequency signal.

24. The method of claim 23, further comprising:
said variable frequency signal being an exponential function of said quantity of radiation.

25. The method of claim 19, wherein said step of indicating the representation of said index comprises:
calibrating said indication of index representation in accordance with the sensitivity of said image sensing camera.

26. The method of claim 19, further comprising the steps of:
   a. producing a reference which indicates the location of that index which is susceptible of production;
   b. defining a predetermined point which, when coincident with the reference, renders said index positioned for index representation indication, and adjusting the location of said reference to said predetermined point.

27. The system of claim 4, further comprising:
circuitry for actuating said marking generator for a predetermined time duration.

28. The system of claim 11, further comprising:
circuitry for selectively disabling said feedback circuitry during a predetermined period of time.

29. The system of claim 1, further comprising:
circuitry for limiting the operation of said index producing circuit to a predetermined time period.

30. A scintillation camera comprising:
   a. a display apparatus responsive to radiation signals representing the position of radiation stimuli to produce an image representing the positional location of the stimuli, said image being adjustable in intensity independently of the intensity of said stimuli;
   b. a detector having a predetermined field of view and being responsive to the radiation stimuli to produce the radiation signals;
   c. an image sensing camera positionable relative to said display apparatus to sense the image generated by said display apparatus; and
   d. an exposure control system comprising:
      i. an information control circuit connected to the detector for controlling the amount of exposure of the image to the image sensing camera in response to the accumulation of a predetermined adjustable quantity of radiation stimuli occurring within a predetermined range of locations in said detector field, said controlled exposure amount being an increasing function of said adjustable quantity;

ii. a circuit connected to said information control circuit for producing an index representing the value of said adjustable quantity of radiation, said representation further being controllable as a function of said independent intensity adjustment of said display apparatus, and iii. a circuit for indicating the value of said index representation to enable calibration of the image intensity by said independent intensity adjustment in response to variations in said adjustable quantity of radiation and in said contolled exposure amount to maintain the detectability of the image by the image sensing camera notwithstanding said variations.

31. An exposure control system for use in a scintillation camera couplable to an image sensing camera and having a display apparatus responsive to radiation signals representing the position of radiation stimuli emanating from a subject to produce and expose to the image sensing camera an image representing the positional location of the stimuli, and a detector having a predetermined field of view and being responsive to the radiation stimuli to produce the radiation signals, said exposure control system comprising:

an information control circuit connected to the detector and controlling the amount of exposure of the image to the image sensing camera in response to the accumulation of a predetermined adjustable quantity of radiation stimuli occurring within a predetermined range of locations in said detector field, said controlled exposure amount being a function of said adjustable quantity of radiation.

32. The system of claim 31, wherein:

said information control circuit limits the duration of said exposure in response to the accumulation of said predetermined adjustable radiation quantity.

* * * * *